United States Patent
Huang et al.

(10) Patent No.: US 11,555,927 B2
(45) Date of Patent: Jan. 17, 2023

(54) SYSTEM AND METHOD FOR PROVIDING ONLINE MULTI-LIDAR DYNAMIC OCCUPANCY MAPPING

(71) Applicant: Honda Motor Co., Ltd., Tokyo (JP)

(72) Inventors: Jiawei Huang, San Jose, CA (US); Mahmut Demir, Mountain View, CA (US); Thang Lian, San Pablo, CA (US); Kikuo Fujimura, Palo Alto, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 568 days.

(21) Appl. No.: 16/597,354

(22) Filed: Oct. 9, 2019

(65) Prior Publication Data
US 2020/0249356 A1  Aug. 6, 2020

Related U.S. Application Data (60) Provisional application No. 62/801,474, filed on Feb. 5, 2019.

(51) Int. Cl.
*G01S 17/89* (2020.01)
*G05D 1/02* (2020.01)
*G01S 7/481* (2006.01)

(52) U.S. Cl.
CPC ............ *G01S 17/89* (2013.01); *G01S 7/4815* (2013.01); *G05D 1/0231* (2013.01); *G05D 2201/0213* (2013.01)

(58) Field of Classification Search
CPC ..... G01S 17/89; G01S 7/4815; G05D 1/0231; G05D 2201/0213; G05D 1/02
USPC .......................................................... 701/23
See application file for complete search history.

(56) References Cited

U.S. PATENT DOCUMENTS

| | | | | |
|---|---|---|---|---|
| 2014/0112541 | A1* | 4/2014 | Golan | G06V 40/10 382/199 |
| 2014/0270476 | A1* | 9/2014 | Cameron | G06V 20/64 382/154 |
| 2019/0236381 | A1* | 8/2019 | Rochan Meganathan | G06T 7/70 |
| 2019/0384302 | A1* | 12/2019 | Silva | G05D 1/0248 |
| 2020/0103523 | A1* | 4/2020 | Liu | G01S 13/865 |

FOREIGN PATENT DOCUMENTS

WO  WO-2019121056 A1 *  6/2019  ......... G06K 9/00214

OTHER PUBLICATIONS

Robyn Owens, Feature detection via phase congruency, Jun. 26, 2005 (Year: 2005).*

(Continued)

*Primary Examiner* — Elaine Gort
*Assistant Examiner* — Matthias S Weisfeld
(74) *Attorney, Agent, or Firm* — Rankin, Hill & Clark LLP (57) ABSTRACT

A system and method for providing online multi-LiDAR dynamic occupancy mapping that include receiving LiDAR data from each of a plurality of LiDAR sensors. The system and method also include processing a region of interest grid to compute a static occupancy map of a surrounding environment of the ego vehicle and processing a dynamic occupancy map. The system and method further include controlling the ego vehicle to be operated based on the dynamic occupancy map.

20 Claims, 9 Drawing Sheets

(56) References Cited

OTHER PUBLICATIONS

Mohsen Biglari, Part-based recognition of vehicle make and model, May 23, 2017 (Year: 2017).*

H. Badino, U. Franke, and R. Mester, "Free space computation using stochastic occupancy grids and dynamic," in Programming, Proc. Intl Conf. Computer Vision, Workshop Dynamical Vision, 2007.

A. Börcs, B. Nagy, and C. Benedek, Dynamic 3D Environment Perception and Reconstruction Using a Mobile Rotating Multi-beam Lidar Scanner. Cham: Springer International Publishing, 2015, pp. 153-180.

R. Danescu, F. Oniga, and S. Nedevschi, "Modeling and tracking the driving environment with a particle-based occupancy grid," IEEE Transactions on Intelligent Transportation Systems, vol. 12, No. 4, pp. 1331-1342, Dec. 2011.

A. Elfes, "A sonar-based mapping and navigation system," in Proceedings. 1986 IEEE International Conference on Robotics and Automation, vol. 3, Apr. 1986, pp. 1151-1156.

A. Elfes, "Using occupancy grids for mobile robot perception and navigation," Computer, vol. 22, No. 6, pp. 46-57, Jun. 1989.

S. Hoermann, M. Bach, and K. Dietmayer, "Dynamic occupancy grid prediction for urban autonomous driving: A deep learning approach with fully automatic labeling," in 2018 IEEE International Conference on Robotics and Automation (ICRA), May 2018, pp. 2056-2063.

S. Hoermann, P. Henzler, M. Bach, and K. Dietmayer, "Object detection on dynamic occupancy grid maps using deep learning and automatic label generation," in 2018 IEEE Intelligent Vehicles Symposium (IV), Jun. 2018, pp. 826-833.

H. Jaspers, M. Himmelsbach, and H. Wuensche, "Multi-modal local terrain maps from vision and lidar," in Intelligent Vehicles Symposium. IEEE, 2017, pp. 1119-1125.

H. Jeon, D. Kum, and W. Jeong, "Traffic scene prediction via deep learning: Introduction of multi-channel occupancy grid map as a scene representation," in 2018 IEEE Intelligent Vehicles Symposium (IV), Jun. 2018, pp. 1496-1501.

H. Moravec and A. Elfes, "High resolution maps from wide angle sonar," in Proceedings. 1985 IEEE International Conference on Robotics and Automation, vol. 2, Mar. 1985, pp. 116-121.

M. Nixon and A. S. Aguado, Feature Extraction & Image Processing for Computer Vision, Third Edition, 3rd ed. Orlando, FL, USA: Academic Press, Inc., 2012.

D. Nuss, S. Reuter, M. Thom, T. Yuan, G. Krehl, M. Maile, A. Gern, and K. C. J. Dietmayer, "A random finite set approach for dynamic occupancy grid maps with real-time application," CoRR, vol. abs/1605.02406, 2016.

S. Reuter and K. Dietmayer, "Fuzzy estimation and segmentation for laser range scans," in Proceedings of 12th International Conference on Information Fusion, Seattle, USA, 2009, pp. 1974-1981.

D. Stumper, F. Gies, S. Hoermann, and K. Dietmayer, "Offline object extraction from dynamic occupancy grid map sequences," in 2018 IEEE Intelligent Vehicles Symposium (IV), Jun. 2018, pp. 389-396.

J. Wessner and W. Utschick, "Extending occupancy grid mapping for dynamic environments," in 2018 IEEE Intelligent Vehicles Symposium (IV), Jun. 2018, pp. 701-707.

S. Wirges, C. Stiller, and F. Hartenbach, "Evidential occupancy grid map augmentation using deep learning," in 2018 IEEE Intelligent Vehicles Symposium (IV), Jun. 2018, pp. 668-673.

S. Thrun, W. Burgard, and D. Fox, Probabilistic Robotics (Intelligent Robotics and Autonomous Agents). The MIT Press, 2005.

* cited by examiner

SYSTEM AND METHOD FOR PROVIDING ONLINE MULTI-LIDAR DYNAMIC OCCUPANCY MAPPING

CROSS-REFERENCE TO RELATED APPLICATION

This application claims priority to U.S. Provisional Application Ser. No. 62/801,474 filed on Feb. 5, 2019, which is expressly incorporated herein by reference.

BACKGROUND

Occupancy maps offer a useful representation of an environment for applications in automated driving and robotics. However, traditional camera-based methods are not robust enough. For example, such detection methods may not be able to be solely relied upon to detect arbitrary obstacles such as a rock on a roadway or oddly-shaped debris. Training of such models to detect arbitrary obstacles may be prohibitively expensive. Static occupancy maps only provide obstacle position information. For safe and smooth on-line operation of automated vehicles, it is necessary to estimate the velocity of moving obstacles.

BRIEF DESCRIPTION

According to one aspect, a computer-implemented method for providing online multi-LiDAR dynamic occupancy mapping that includes receiving LiDAR data from each of a plurality of LiDAR sensors. The LiDAR data is associated with a surrounding environment of an ego vehicle. The computer-implemented method also includes processing a region of interest grid to compute a static occupancy map of the surrounding environment of the ego vehicle and processing a dynamic occupancy map. Phase congruency is utilized to segment dynamic and static objects. The computer-implemented method further includes controlling the ego vehicle to be operated based on the dynamic occupancy map.

According to another aspect, a system for providing online multi-LiDAR dynamic occupancy mapping that includes a memory storing instructions when executed by a processor cause the processor to receive LiDAR data from each of a plurality of LiDAR sensors, wherein the LiDAR data is associated with a surrounding environment of an ego vehicle. The instructions also cause the processor to process a region of interest grid to compute a static occupancy map of the surrounding environment of the ego vehicle and process a dynamic occupancy map. Phase congruency is utilized to segment dynamic and static objects. The instructions further cause the processor to control the ego vehicle to be operated based on the dynamic occupancy map.

According to yet another aspect, a non-transitory computer readable storage medium storing instructions that when executed by a computer, which includes a processor perform a method that includes receiving LiDAR data from each of a plurality of LiDAR sensors. The LiDAR data is associated with a surrounding environment of an ego vehicle. The method also includes processing a region of interest grid to compute a static occupancy map of the surrounding environment of the ego vehicle and processing a dynamic occupancy map. Phase congruency is utilized to segment dynamic and static objects. The method further includes controlling the ego vehicle to be operated based on the dynamic occupancy map.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Figure 1:
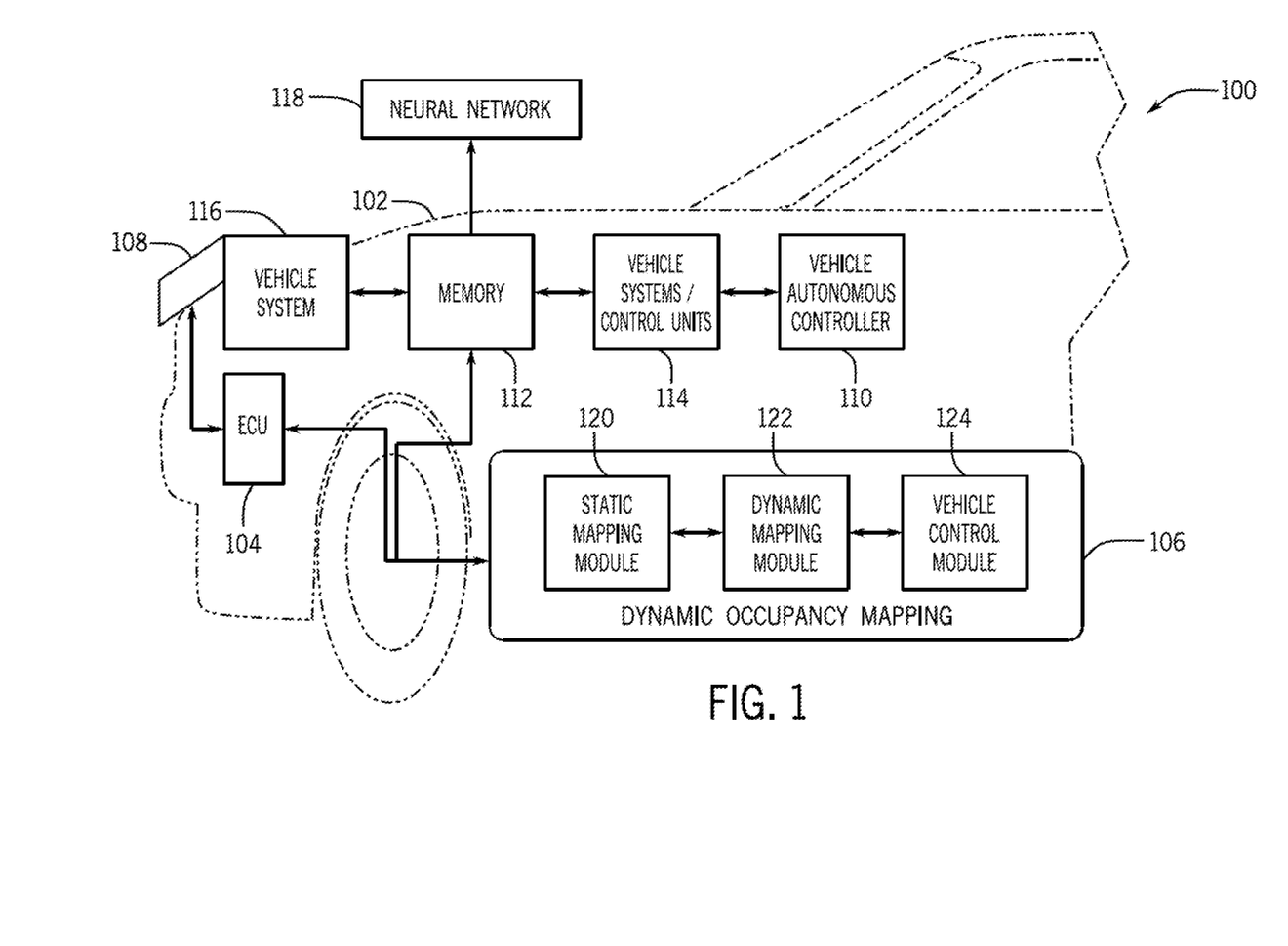
FIG. 1 is a schematic view of an exemplary operating environment for implementing systems and methods for providing online multi-LiDAR dynamic occupancy mapping of a surrounding environment of an ego vehicle according to an exemplary embodiment of the present disclosure.

Referring now to the drawings, wherein the showings are for purposes of illustrating one or more exemplary embodiments and not for purposes of limiting the same, FIG. 1 is a schematic view of an exemplary operating environment 100 for implementing systems and methods for providing online multi-LiDAR dynamic occupancy mapping of a surrounding environment of an ego vehicle 102 according to an exemplary embodiment of the present disclosure. The components of the environment 100, as well as the components of other systems, hardware architectures, and software architectures discussed herein, may be combined, omitted, or organized into different architectures for various embodiments.

Generally, the environment includes the ego vehicle 102 that includes a plurality of components that are operably controlled by an electronic control unit 104 (ECU). The ECU 104 may be configured to execute one or more applications, operating systems, vehicle system and subsystem user interfaces, among others. In one embodiment, the ECU 104 may be configured to execute a dynamic occupancy mapping application 106. As discussed in more detail below, the dynamic occupancy mapping application 106 may be configured to utilize dynamic occupancy mapping techniques that may analyze LiDAR data received from a plurality of LiDAR sensors 108 to detect one or more obstacles, one or more static occupants, and/or one or more dynamic occupants that may be located within the surrounding environment of the ego vehicle 102. The surrounding environment of the ego vehicle 102 may be defined as a predetermined area located around (front/sides/behind) the ego vehicle 102 (e.g., road environment in front, sides, and/or behind of the ego vehicle 102) that may include one or more travel paths of the ego vehicle 102.

As discussed in more detail below, the dynamic occupancy mapping application 106 may be configured to execute computer implemented instructions to fuse LiDAR data provided by the plurality of LiDAR sensors 108. The application 106 may additionally complete region of interest (ROI) grid processing and global occupancy grid updates with respect to static occupancy mapping to process a static occupancy map and sensed map of the surrounding environment of the ego vehicle 102. The application 106 may filter the sensed map, update motion cells, and may utilize a phase congruency principal to segment static occupants and dynamic occupants to output a dynamic occupant map that identifies the locations, positions, and/or the trajectories of one or more dynamic occupants that are located within the surrounding environment of the ego vehicle 102. The application 106 may additionally estimate elevation of ground planes found within the surrounding environment of the ego vehicle 102 and may complete ground point removal to remove artifacts in the dynamic occupant map to thereby complete refined dynamic occupancy mapping.

In one embodiment, the one or more dynamic occupants may include one or more road users that are located within the surrounding environment of the ego vehicle 102. The one or more road users may include, but may not be limited to, other vehicles, pedestrians, bikers, and the like that may be located within the surrounding environment of the ego vehicle 102 at one or more points in time. One or more static occupants may also be determined to be located within the surrounding environment of the ego vehicle 102. The one or more static occupants may include but may not be limited to one or more traffic signals, construction cones, construction barrels, guardrails, and the like that may be located within one or more travel paths of the ego vehicle 102 within the surrounding environment of the ego vehicle 102.

In one or more embodiments, the dynamic occupancy mapping application 106 may be configured to communicate with a vehicle autonomous controller 110 of the ego vehicle 102 to execute one or more commands to operably control the ego vehicle 102 to be fully autonomously driven or semi-autonomously driven in a particular manner to account for one or more types of obstacles and/or one or more dynamic occupants as determined by the application 106. In additional embodiments, the application 106 may provide warnings to a driver (not shown) of the ego vehicle 102 through one or more vehicle systems/control units 114 to warn/alert the driver to account for one or more types of obstacles and/or one or more dynamic occupants as detected by the application 106.

With continued reference to FIG. 1, in addition to the ECU 104, the vehicle autonomous controller 110, and the vehicle systems/control units 114, the vehicle may include a plurality of components, for example, a memory 112 and a vehicle LiDAR system 116 that is operably connected to the plurality of LiDAR sensors 108. In one or more embodiments, the ECU 104 may include a microprocessor, one or more application-specific integrated circuit(s) (ASIC), or other similar devices. The ECU 104 may also include internal processing memory, an interface circuit, and bus lines for transferring data, sending commands, and communicating with the plurality of components of the ego vehicle 102.

The ECU 104 may also include a communication device (not shown) for sending data internally within (e.g., between one or more components) the ego vehicle 102 and communicating with externally hosted computing systems (e.g., external to the ego vehicle 102). Generally, the ECU 104 may communicate with the memory 112 to execute the one or more applications, operating systems, vehicle system and subsystem user interfaces, and the like that are stored within the memory 112.

In one embodiment, the ECU 104 may communicate with the vehicle autonomous controller 110 to execute autonomous driving commands to operate the ego vehicle 102 to be fully autonomously driven or semi-autonomously driven in a particular manner that accounts for the one or more types of obstacles and/or one or more dynamic occupants as detected by the application 106. In some embodiments, the ECU 104 may communicate with the vehicle autonomous controller 110 to execute an autonomous driving plan based on an evaluation of the dynamic occupancy map(s) of the surrounding environment of the ego vehicle 102 as computed by the dynamic occupancy mapping application 106.

In one embodiment, the vehicle autonomous controller 110 may additionally provide one or more commands to one or more of the vehicle systems/control units 114 of the ego vehicle 102, including, but not limited to an engine control unit, a braking control unit, a transmission control unit, a steering control unit, and the like to control the ego vehicle 102 to be autonomously driven upon the application 106 determining one or more dynamic occupants based on computing and analyzing the dynamic occupancy map(s).

Accordingly, the vehicle autonomous controller 110 may be configured to provide one or more commands (signals) to one or more of the vehicle systems and control units 114 to provide full autonomous or semi-autonomous control of the ego vehicle 102. Such autonomous control of the ego vehicle 102 may be provided by sending one or more commands to control one or more of the vehicle systems/control units 114 to operate (e.g., drive) the ego vehicle 102 during one or more circumstances (e.g., when providing driver assist controls), and/or fully to control operation of the ego vehicle 102 during an entire trip of the ego vehicle 102.

In some configurations, the vehicle systems/control units 114 may also include Advanced Driver Assistance Systems (ADAS), for example, an adaptive cruise control system, a blind spot monitoring system, a collision mitigation system, a lane departure warning system, among others (not individually shown) that may be utilized to provide warnings/alerts to the driver of the ego vehicle 102 (e.g., if the ego vehicle 102 is being driven by a driver and not autonomously) for preemptive collision avoidance purposes based on the locations, positions, and/or trajectories of one or more road users within the vicinity of the ego vehicle 102.

In one configuration, the memory 112 of the ego vehicle 102 may be configured to store one or more executable files associated with one or more operating systems, applications, associated operating system data, application data, vehicle system and subsystem user interface data, and the like that are executed by the ECU 104. In some embodiments, the memory 112 may include one or more road user models (not shown) that may be associated with one or more types of road users. The one or more road user models may represent values that include a range of sizes and features (based on image data) that are associated to respective types of road users (e.g., automobiles, pedestrians, bicyclists, etc.) In some configurations, the application 106 may analyze the road user models to further classify one or more dynamic occupants determined based on the dynamic occupancy map(s) computed by the application 106.

In one embodiment, the memory 112 may include a neural network 118 that may be configured to execute computer/machine based/deep learning techniques to further execute one or more algorithms to compute dynamic occupancy mapping. The neural network 118 may be configured as a shallow neural network, a convolutional neural network, a Recurrent Neural Network that includes a plurality of fully connected layers, or another type of neural network. In one embodiment, the neural network 118 may utilize the ECU 104 of the ego vehicle 102 to process a programming model which enables computer/machine based/deep learning that may be centered on one or more forms of data that are inputted to the neural network 118. In some embodiments, the dynamic occupancy mapping application 106 may communicate with the neural network 118 to send and receive data with respect to the computing of static occupancy mapping and dynamic occupancy mapping of the surrounding environment of the ego vehicle 102.

In an exemplary embodiment, the plurality of LiDAR sensors 108 of the vehicle LiDAR system 116 may include one or more planar sweep lasers that include respective three-dimensional LiDAR sensors that may be configured to oscillate and emit one or more laser beams of ultraviolet, visible, or near infrared light toward the scene of the surrounding environment of the ego vehicle 102. The plurality of LiDAR sensors 108 may be configured to receive one or more reflected laser waves (e.g., signals) that are reflected off one or more objects and occupants located within the surrounding environment of the ego vehicle 102. In other words, upon transmitting the one or more laser beams to the surrounding environment of the ego vehicle 102, the one or more laser beams may be reflected as laser waves by one or more obstacles, static occupants (e.g., traffic cones, lamp posts), and/or dynamic occupants such as road users that may be located within the surrounding environment of the ego vehicle 102 at one or more points in time.

In one embodiment, each of the plurality of LiDAR sensors 108 may be configured to analyze the reflected laser waves and output respective LiDAR data to the dynamic occupancy mapping application 106. The LiDAR data may include LiDAR coordinates that may be associated with the locations, depths, and/or dimensions (e.g., measurements) of one or more objects and/or occupants that may be located within the surrounding environment of the ego vehicle 102. As discussed below, the LiDAR data received from each of the plurality of LiDAR sensors 108 may be analyzed by the dynamic occupancy mapping application 106 to process a ROI grid for the LiDAR data received from each of the plurality of LiDAR sensors 108 and to update a global occupancy grid to compute a static occupancy map of the surrounding environment of the ego vehicle 102 and to further compute a dynamic occupancy map of the surrounding environment of the vehicle 102.

II. The Dynamic Occupancy Mapping Application and Related Methods

The general functionality of the dynamic occupancy mapping application 106 will now be discussed in more detail with respect to exemplary methods that may be executed by the application 106. In an exemplary embodiment, the dynamic occupancy mapping application 106 may be fully or partially executed by the ECU 104 of the ego vehicle 102. Additionally, or alternatively the dynamic occupancy mapping application 106 may be fully or partially executed by an externally hosted server infrastructure (not shown) that may be accessed through a communication unit (not shown) of the ego vehicle 102.

As shown in FIG. 1, the dynamic occupancy mapping application 106 may include a plurality of modules 120-124 that may execute computer-implemented instructions for providing online multi-LiDAR dynamic occupancy mapping. In an exemplary embodiment, the plurality of modules 120-124 may include a static mapping module 120, a dynamic mapping module 122, and a vehicle control module 124. It is appreciated that the dynamic occupancy mapping application 106 may include one or more additional modules and/or sub-modules that are included in lieu of the modules 120-124.

Figure 2:
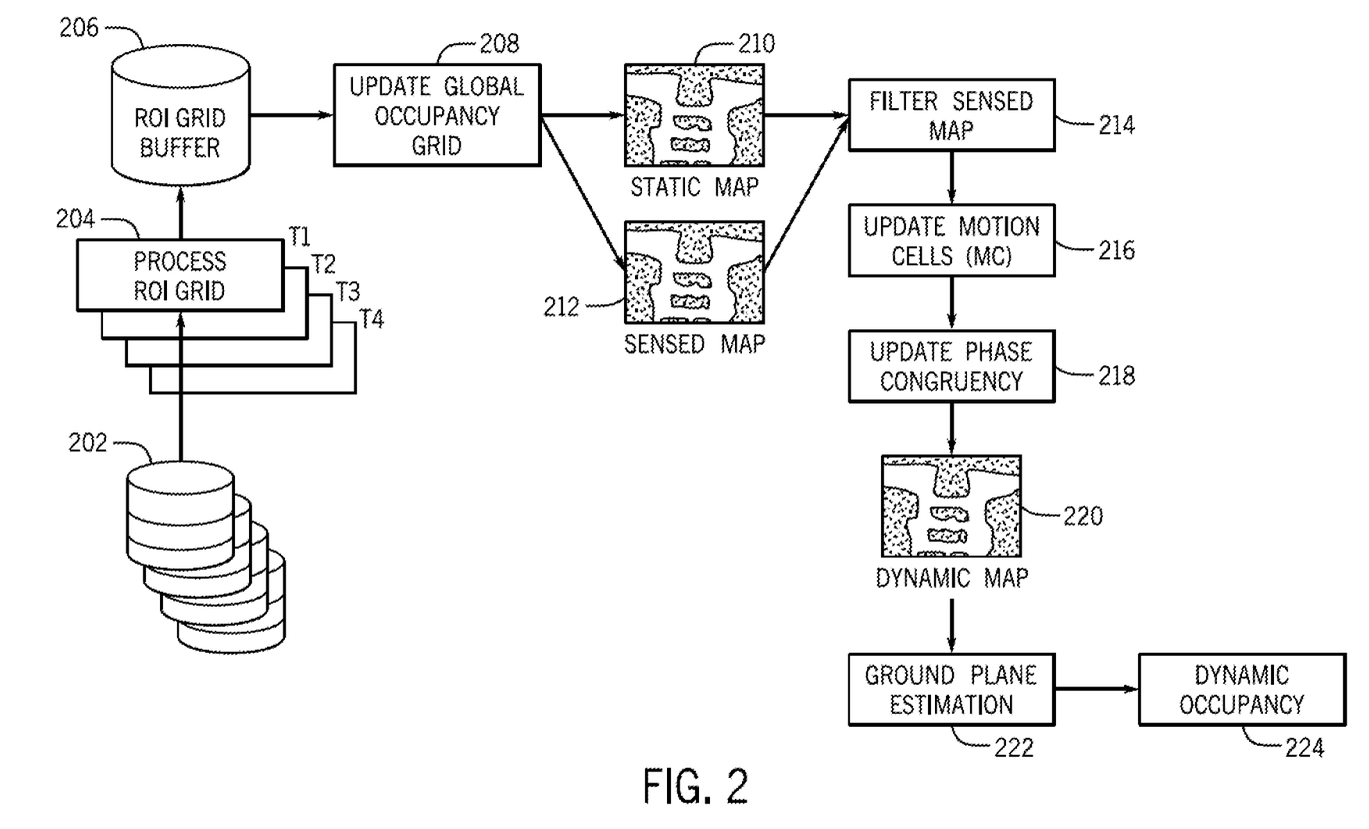
FIG. 2 is a general schematic overview of general process steps executed by the plurality of modules of a dynamic occupancy mapping application according to an exemplary embodiment of the present disclosure.

FIG. 2 illustrates a general schematic overview of general process steps executed by the plurality of modules 120-124 of the dynamic occupancy mapping application 106 according to an exemplary embodiment of the present disclosure. In an exemplary embodiment, the static mapping module 120 may be configured to receive LiDAR data from the vehicle LiDAR system 116. The LiDAR data may be received from each of the plurality of LiDAR sensors 108.

The static mapping module 120 may be configured to complete ROI grid processing 204 based on a plurality of ROI grids that are received from a ROI grid pool 202 and LiDAR data received from each of the plurality of LiDAR sensors 108. As shown in the illustrative example of FIG. 2, the ROI grid processing 204 may be individually and concurrently completed for LiDAR data that is received from each of the plurality of LiDAR sensors 108 (in this example 4 LiDAR sensors labeled T1, T2, T3, T4). As discussed in more detail below, the static mapping module 120 may be configured to store processed ROI grids within a ROI grid buffer 206 (e.g., data structure) to be used during updating of a global occupancy grid 208. Based on the updated of a global occupancy grid 208, the static mapping module 120 may be configured to process a static occupancy map 210 and a sensed map 212 of the surrounding environment of the ego vehicle 102.

With continued reference to FIG. 1 and FIG. 2, in an exemplary embodiment, the static mapping module 120 may be configured to communicate data that pertains to the static occupancy map 210 and the sensed map 212 of the surrounding environment of the vehicle 102 to the dynamic mapping module 122. The dynamic mapping module 122 may be configured to analyze the data and perform sensed map filtering 214. Upon performing sensed map filtering 214, the dynamic mapping module 122 may perform a motion cell updating process 216 and a phase congruency updating process 218 to compute a dynamic occupancy map 220 of the surrounding environment of the ego vehicle 102.

In one embodiment, upon computing the dynamic occupancy map 220 of the surrounding environment of the ego vehicle 102, the dynamic mapping module 122 may be configured to complete ground plane estimation 222 to complete refined dynamic occupancy mapping 224. The dynamic mapping module 122 may thereby complete online multi-LiDAR dynamic occupancy mapping of the ego vehicle 102 and may communicate data pertaining to one or more dynamic occupants that are located within the surrounding environment of the ego vehicle 102 to the vehicle control module 124.

In an exemplary, the vehicle control module 124 may be configured to communicate with the vehicle autonomous controller 110 of the ego vehicle 102 to execute one or more commands to operably control the ego vehicle 102 to be fully autonomously driven or semi-autonomously driven in a particular manner to account for one or more types of obstacles and/or one or more dynamic occupants determined to be located within the surrounding environment of the ego vehicle 102 based on the completion of the online multi-LiDAR dynamic occupancy mapping.

Figure 3:
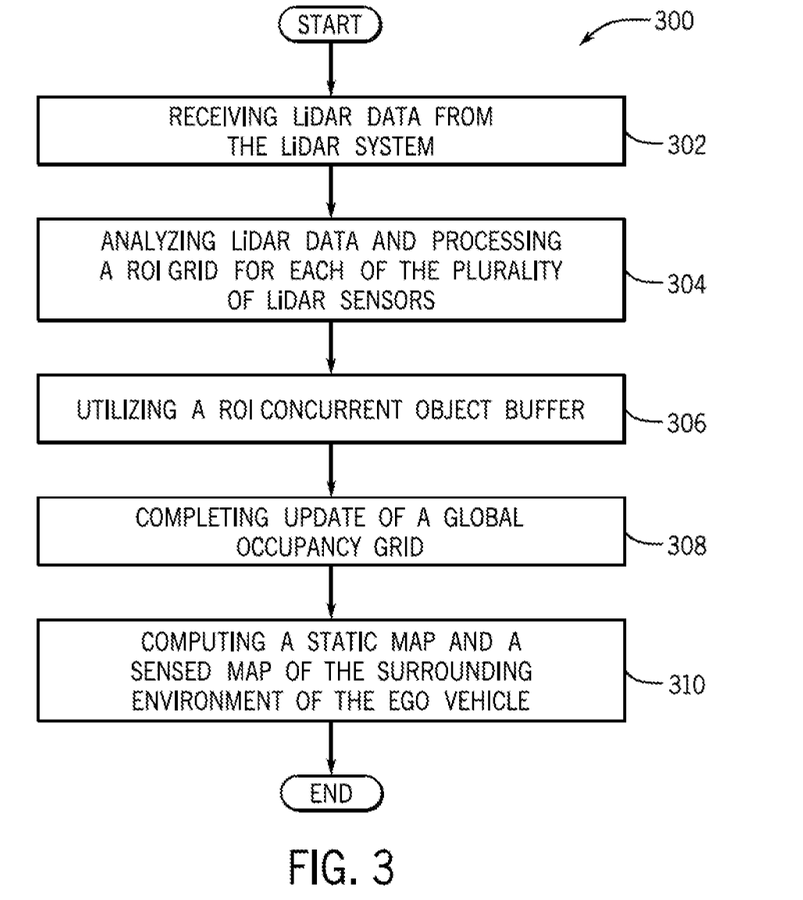
FIG. 3 is a process flow diagram of a method for processing a static occupancy map and a sensed map of the surrounding environment of the ego vehicle according to an exemplary embodiment of the present disclosure.

FIG. 3 is a process flow diagram of a method 300 for processing a static occupancy map and a sensed map of the surrounding environment of the ego vehicle 102 according to an exemplary embodiment of the present disclosure. FIG. 3 will be described with reference to the components of FIG. 1, through it is to be appreciated that the method 300 of FIG. 3 may be used with additional and/or alternative system components. The method 300 may begin at block 302, wherein the method 300 may include receiving LiDAR data from the vehicle LiDAR system 116.

In an exemplary embodiment, the static mapping module 120 may be configured to communicate with the vehicle LiDAR system 116 to receive LiDAR data that may be provided from each of the plurality of LiDAR sensors 108 of the ego vehicle 102. In one configuration, each of the plurality of LiDAR sensors 108 may be configured to receive one or more reflected laser waves that are reflected off one or more objects that may include, but may not be limited to, one or more static occupants and/or one or more dynamic occupants that may be located within the surrounding environment of the ego vehicle 102 at one or more points in time.

In one embodiment, the each of the plurality of LiDAR sensors 108 may be configured to analyze the reflected laser waves and output respective LiDAR data to the static mapping module 120 of the dynamic occupancy mapping application 106. The LiDAR data may include LiDAR coordinates that may be associated with the locations, depths, and/or dimensions (e.g., measurements) of one or more static occupants and/or one or more dynamic occupants that may be located within the surrounding environment of the ego vehicle 102.

The method 300 may proceed to block 304, wherein the method 300 may include analyzing LiDAR data and processing a ROI grid for each of the plurality of LiDAR sensors 108. In an exemplary embodiment, upon receiving the LiDAR data from the vehicle LiDAR system 116 that is provided from each of the plurality of LiDAR sensors 108 of the ego vehicle 102, the static mapping module 120 may be configured access the ROI grid pool 202. The ROI grid pool 202 may be configured as a memory reserve that stores one or more ROI grids. Accordingly, the static mapping module 120 may process and update a ROI grid from the ROI grid pool each time LiDAR data is received from each of the plurality of LiDAR sensors 108 during the ROI grid mapping process. As shown in FIG. 2, a plurality of ROI grids may be received from the ROI grid pool 202 and processed during ROI grid processing 204 to be updated concurrently for the LiDAR data received from each of the plurality of LiDAR sensors 108 (e.g., T1-T4 for each of four LiDAR sensors 108). Stated differently, ROI grid mapping calculations may be processed to be update the ROI grids in parallel for each of the plurality of LiDAR sensors 108.

The ROI grid(s) may be defined as a set of cells M={$m_1 \ldots m_G$} which may partition a space(s) of the surrounding environment of the ego vehicle 102 captured by a respective LiDAR sensor(s) 108 into finitely fixed sized grids. In one embodiment, during the updating of the ROI grid, the static mapping module 120 may be configured to update the ROI grid(s) of the surrounding environment of the ego vehicle 102 that enable LiDAR sensor coordinate measurements that are derived from the respective LiDAR data and occupancy grid data to be in a local coordinate frame of the ego vehicle 102.

Figure 4:
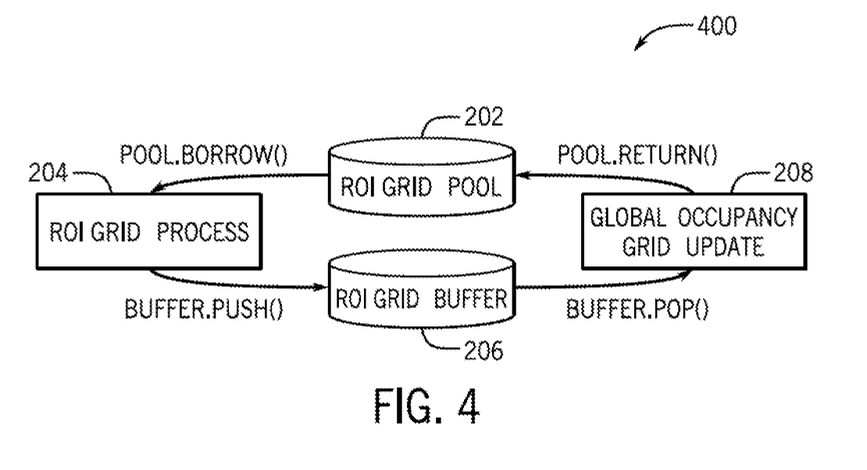
FIG. 4 is a general schematic overview of a concurrent object buffer used by the dynamic occupancy mapping application according to an exemplary embodiment of the present disclosure.

The method 300 may proceed to block 306, wherein the method 300 may include utilizing a ROI concurrent object buffer. In an exemplary embodiment, the static mapping module 120 may utilize a ROI concurrent object buffer to store data associated with each of the ROI grids processed based on the LiDAR data received from each of the LiDAR sensors 108. With reference to FIG. 4, the concurrent object buffer 400 may include the ROI grid pool 202. As discussed, the static mapping module 120 may utilize a ROI grid from the ROI grid pool 202 each time LiDAR data is received that is provided by each of the plurality of LiDAR sensors 108.

The ROI grid is updated through the ROI grid process 204 and then stored within the ROI grid buffer 206 to be utilized in the global occupancy and grid update processing. As shown in FIG. 4, upon completing the global occupancy and grid update processing the ROI grid may be returned and stored within the ROI grid pool 202 to thereby be utilized by the ROI grid process 204 during a next iteration of ROI grid process 204 for further updating of the static occupancy map 210 of the surrounding environment of the ego vehicle 102. In other words, the ROI grid is stored back upon the ROI grid pool 202 to allow the already processed ROI grid to be reused in further measurements.

Referring again to FIG. 3, the method 300 may proceed to block 308, wherein the method 300 may include completing update of a global occupancy grid. The ROI grid may be configured to move freely as the ego vehicle 102 moves over a global occupancy grid of the surrounding environment of the ego vehicle 102. A maximum ROI grid size may be configured to be $1/\sqrt{2}$ of the global grid. Accordingly, as the ego vehicle 102 navigates over a large area, the static mapping module 120 may analyze the LiDAR data received from each of the plurality of LiDAR sensors 108 and may use a cyclic world structure.

Figure 5:
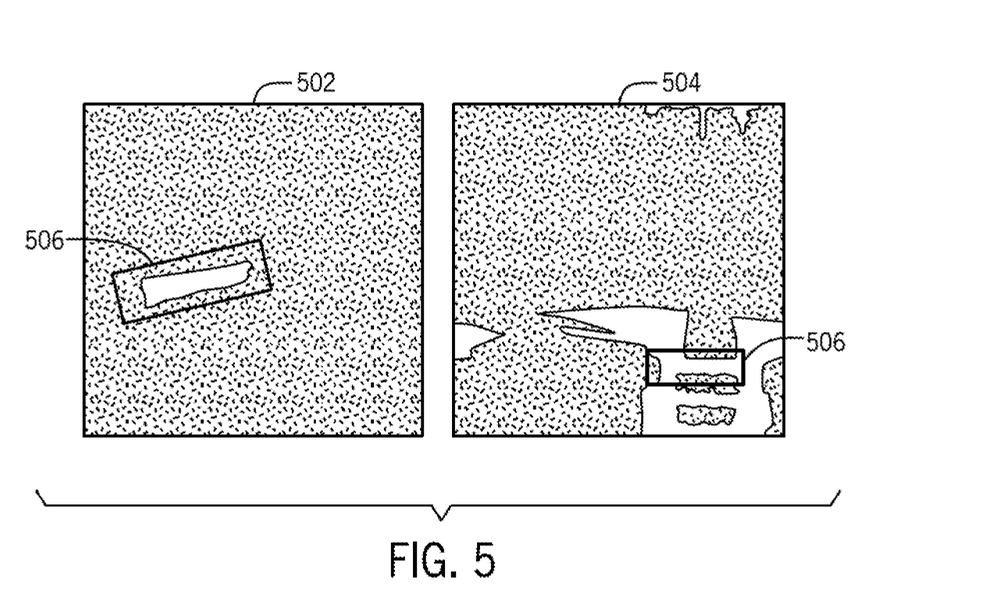
FIG. 5 is an illustrative example of the ROI grid created based on LiDAR data according to an exemplary embodiment of the present disclosure.

With reference to FIG. 5, an illustrative example of the ROI grid created based on LiDAR data according to an exemplary embodiment of the present disclosure, an ROI grid 502 may be processed from a LiDAR sensor 108 that may be disposed at a front left side of the ego vehicle 102 as one of the inputs that may be utilized to process a global occupancy map 504. As the ego vehicle 102 navigates over a large area, the static mapping module 120 may analyze the LiDAR data received from each of the plurality of LiDAR sensors 108 and may use a cyclic world structure to output the global occupancy map from LiDAR data that is provided by the plurality of LiDAR sensors 108. As designated by the rectangle 506, a region captured within the ROI grid 502 is updated from the ROI grid 502 within the global occupancy map 504.

In one embodiment, the static mapping module 120 may detect obstacles based on a point cloud $P_t$ determined from the LiDAR data. The static mapping module 120 may be configured to transform the point coordinates from the sensor frame to the ego vehicle frame. The static mapping module 120 may be further configured to distribute the transformed point coordinates into ROI cells based on their two-dimensional LiDAR coordinates derived from the LiDAR data provided by each of the plurality of LiDAR sensors 108. The static mapping module 120 may thereby analyze points within each cell to determine if each cell contains a positive or overhanging obstacle.

More specifically, the static mapping module 120 may analyze points within each cell to determine if one or more points correspond to a positive or overhanging obstacle that may be determined based on LiDAR rays that may be reflected back to one or more respective LiDAR sensors 108 from one or more objects at multiple heights. In particular, the static mapping module 120 may analyze the height difference between a highest and lowest point in each ROI cell against a predetermined obstacle threshold to determine if the height difference is greater than the predetermined obstacle threshold. If the height difference is determined to be greater than the predetermined obstacle threshold, the cell may be marked as an obstacle cell.

The static mapping module 120 may determine overhanging obstacles based on determination that there are two consecutive points with a height difference that is greater than the height of the ego vehicle 102 and/or the height difference of the points under the overhanding structure are lower than the predetermined obstacle threshold. In one embodiment, upon detecting occupied cells, the static mapping module 120 may use an inverse sensor model to classify cells as free or occluded. The module 120 may utilize a polar occupancy structure that includes a plurality of vector range measurements at discrete angles. In an exemplary embodiment, the static mapping module 120 may compute the polar occupancy structure for all LiDAR points associated with all of the obstacle cells of the ROI grid. The static mapping module 120 may thereby iterate through all cells within the ROI grid and set occupancy probabilities (e.g., probability P of cells states) based on their polar coordinates relative to the obstacles. The module 120 may further find occupancy grid cells using the ego vehicle's known pose. Cells within close range to an obstacle may be assigned an occupancy value of $p_{occ}$, cells with a shorter range may be assigned a value of $p_{free}$ and cells with further range may be assigned a value of $p_{prior}$.

Figure 6:
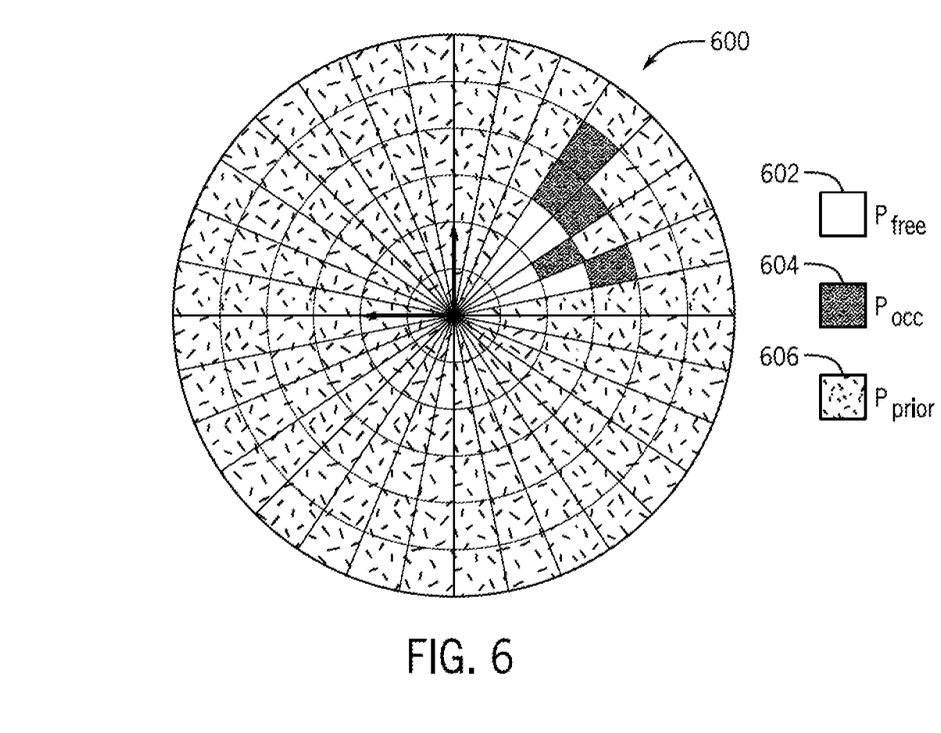
FIG. 6 is an illustrative example of a global polar occupancy grid according to an exemplary embodiment of the present disclosure.

As shown in FIG. 6, an illustrative example of a global polar occupancy grid 600 according to an exemplary embodiment of the present disclosure. The polar occupancy may be processed by the static mapping module 120 during implementation of the inverse sensor model. The global polar occupancy grid 600 may include points that are associated with obstacles. Additionally, the global polar occupancy grid 600 may include cells 604 that are occupied and are assigned a value of $P_{occ}$. Cells 602 with a shorter range that are located until the first obstacle are assigned a value of $P_{free}$ and cells 606 with further range are assigned a value of $P_{prior}$. Accordingly, the static mapping module 120 iterates global mapping grid probabilities over all ROI grids stored in the ROI grid buffer 206 (e.g., one at a time) and returns the ROI grid back to the ROI grid pool 202 to be reused in next measurements.

When the ego vehicle 102 is in motion the global occupancy grid cells may retain probabilities from previous times but associated with different world coordinates. Accordingly, the static mapping module 120 may be configured to associate each cell with a timestamp value to classify the time from which the probability is determined. The timestamp value may be updated each time if it is within the ROI grid. In one configuration, before completing the update of the global occupancy grid 208, the dynamic mapping module 122 may check the timestamp value and set the cell occupancy to $p_{prior}$ if the timestamp is outdated. This functionality may enable the utilization of the cyclic world structure that is illustrated in FIG. 5.

Referring again to FIG. 3, the method 300 may proceed to block 310, wherein the method 300 may include computing a static occupancy map 210 and a sensed map 212 of the surrounding environment of the ego vehicle 102. In an exemplary embodiment, the static mapping module 120 may be configured to analyze the global occupancy grid and polar occupancy values and may thereby compute a static occupancy map 210 and a sensed map 212 of the surrounding environment of the ego vehicle 102. The sensed map 212 may include a map of the sensed objects that are located within the surrounding environment of the ego vehicle 102. The static occupancy map 210 may be computed based on the analysis of the cells of the global polar occupancy grid 600 that may include cells 604 that are occupied and are assigned a value of $p_{occ}$, cells 602 with a shorter range that are located until the first obstacle are assigned a value of $p_{free}$, and cells 606 with further range are assigned a value of $p_{prior}$ and may also take into account the ego vehicle's known pose. Accordingly, the static occupancy map is computed based on a static position of the ego vehicle 102 within the surrounding environment of the ego vehicle 102 that is based on the probabilities of cells states and the pose of the ego vehicle 102.

Figure 7:
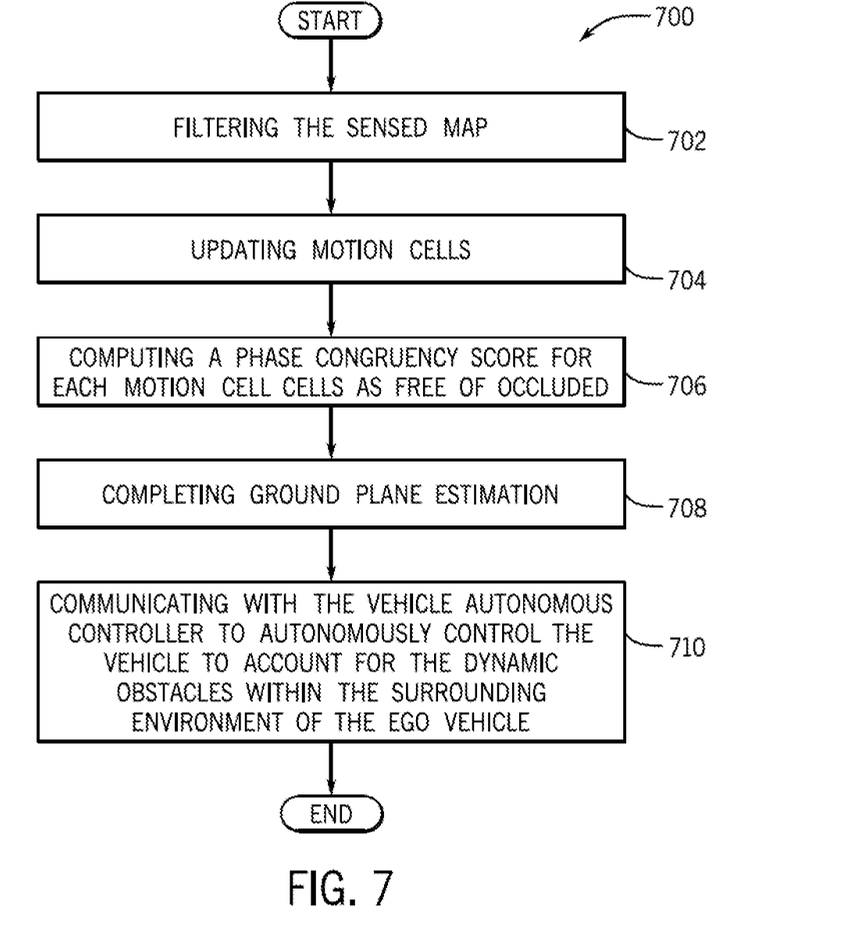
FIG. 7 is a process flow diagram of a method for processing a dynamic occupancy map of the surrounding environment of the ego vehicle according to an exemplary embodiment of the present disclosure.

FIG. 7 is a process flow diagram of a method 700 for processing a dynamic occupancy map of the surrounding environment of the ego vehicle 102 according to an exemplary embodiment of the present disclosure. FIG. 7 will be described with reference to the components of FIG. 1, through it is to be appreciated that the method 700 of FIG. 7 may be used with additional and/or alternative system components. The method 700 may begin at block 702, wherein the method 700 may include filtering the sensed map. In an exemplary embodiment, the dynamic mapping module 122 of the dynamic occupancy mapping application 106 may be configured to analyze the static occupancy map 210 and sensed map 212 and may perform a filtering step where all sensed calls that are within a predetermined close distance to static cells that are occupied (e.g., assigned a value of $p_{occ}$) are removed. The remaining cells may be labeled as filtered sensed cells determined as candidates for dynamic cells.

The method 700 may proceed to block 704, wherein the method 700 may include updating motion cells. In an exemplary embodiment, the filtered sensed cells may be assigned cell locations to every motion cell to which they belong. With respect to the updating of motion cells, the dynamic mapping module 122 may be configured to use a log-odds representation of recursive binary Bayesian filter provided in the following equation:

$$l_{t,i} = \log\frac{p(m_i|z_t, x_t)}{1 - p(m_i|z_t, x_t)} - \log\frac{p_{prior}}{1 - p_{prior}} + l_{t-1,i}$$

to update obstacle probabilities of corresponding cells. $p(m_i|z_t,x_t)$ is calculated for each motion cell $m_i$ using an inverse sensor model.

Figure 8:
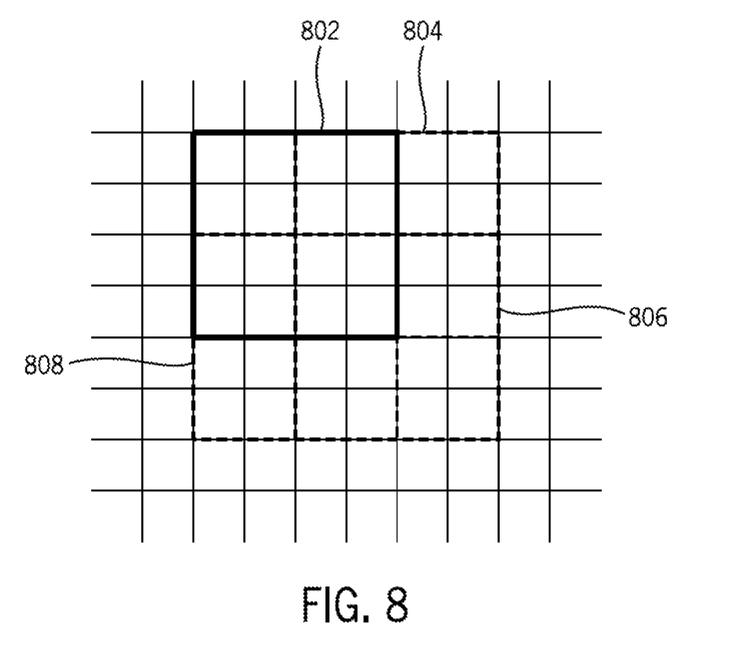
FIG. 8 is an illustrative example of a layout of motion cells across an occupancy map vehicle according to an exemplary embodiment of the present disclosure.

Accordingly, the dynamic mapping module 122 may be configured to update each motion cell which includes a grid of occupancy cells. As shown in FIG. 8, the motion cells indicated by the solid box 802 and dashed boxes 804-808 may include smaller 4×4 occupancy cells.

Referring again to FIG. 7, the method 700 may proceed to block 706, wherein the method 700 may include computing a phase congruency score for each motion cell. In one embodiment, upon updating the motion cells, the dynamic mapping module 122 may combine the motion vectors with motion vectors obtained at previous iterations to compute a phase congruency score for each motion cell.

The phase congruency (PC) may be equal to the ratio between the sum of the vector's norm (shown as the numerator below) and the sum of the individual vector's norm (shown as the denominator below):

$$PC = \frac{|\Sigma V_n|}{\Sigma |V_n|}$$

Figure 9A:
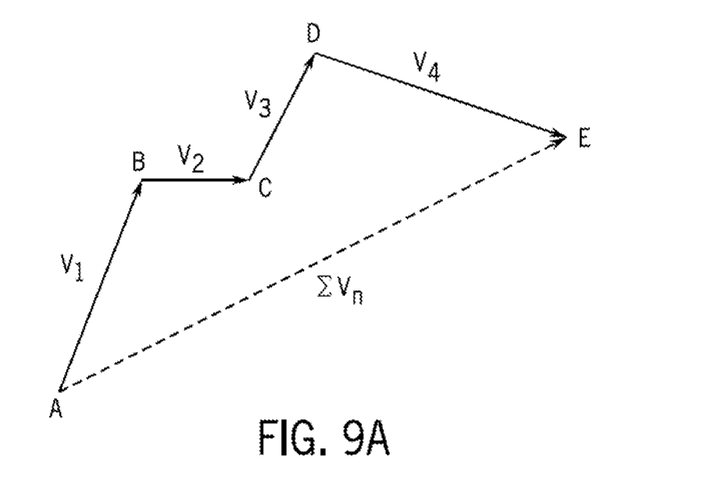
FIG. 9A is an illustrative example of the phase congruency concept according to an exemplary embodiment of the present disclosure.

With reference to FIG. 9A, an illustrative example of the phase congruency concept according to an exemplary embodiment of the present disclosure. As shown with respect to utilizing four vectors, the value of phase congruency is equal to the ratio of the length of the sum vector (|AE|) and the sum of individual vectors (|AB|+|BC|+|CD|+|DE|). Accordingly, the value of phase congruency may be between 0 and 1. The value of the phase congruency may reach 1 when all components have exactly the same phase and are perfectly aligned. The value of phrase congruency may approach 0 when all components have random phases.

Figure 9B:
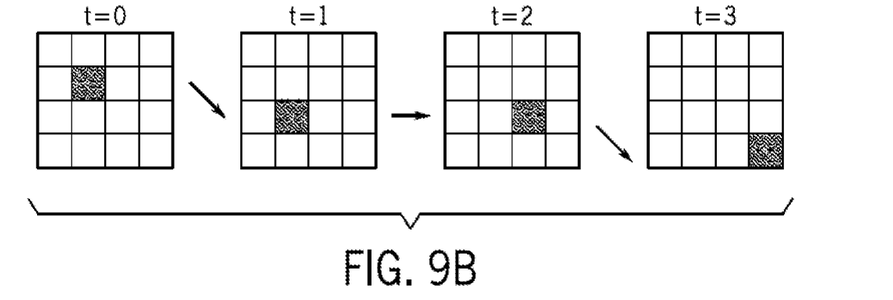
FIG. 9B is an illustrative example of motion vectors according to an exemplary embodiment of the present disclosure.

In one configuration, the dynamic mapping module 122 may utilize the phase congruency concept to detect dynamic motion. The module 122 may be configured to define the motion vector as a vector pointing from an occupied cell in t to another occupied cell at t+1. In other words, for each motion cell, the dynamic mapping module 122 may be configured to compute a set of motion vectors from cells assigned at t−1 and t. As shown in FIG. 9B, within an illustrative example, the motion vectors are shown from t=0 to t=3.

As discussed above, upon updating the motion cells, the dynamic mapping module 122 may combine the motion vectors with motion vectors obtained at previous steps to compute a phase congruency score for each motion cell. The dynamic mapping module 122 may be configured to compute the phase congruency score for each motion cell and may compare the phase congruence score against a predetermined phase congruency threshold (e.g., 0.7). If the dynamic mapping module 122 determines that the phase congruency score is above the predetermined phase congruency threshold, the dynamic mapping module 122 may denote the newly assigned cells in the respective motion cell as dynamic cells. For example, as shown in FIG. 9B, the dynamic mapping module 122 may denote the newly assigned shaded cells in t=1, t−2, and t=3 as dynamic cells.

Since the phase congruency score may measure how well many motion vectors are aligned, the dynamic mapping module 122 may be configured to determine a dominant motion direction using phase congruency. Accordingly, in a short time window when all targets are assumed to follow linear motion, the motion vectors may be produced of similar direction in both spatial and temporal vicinity (e.g., in both a small region around a target as well as in a small time window). As shown within the illustrative example of FIG. 8, a layout of motion cells across an occupancy map 800 may be shown with partial overlap so that motion vectors crossing motion cell boundaries are minimized. As shown, the motion cell included within the solid box 802 may partially overlap over the motion cells 804-808 included within the dashed boxes that include adjacent motion cells.

In one embodiment, upon computing the phase congruency score for each motion cell, comparing the phase congruency score(s) against the predetermined phase congruency threshold, and determining dynamic cells that are determined to include moving objects, the dynamic mapping module 122 may be configured to compute the dynamic occupancy map 220 of the surrounding environment of the ego vehicle 102. The dynamic occupancy map 220 provides a determination of dynamic occupants such as road users that may be located within the surrounding environment of the ego vehicle 102. The dynamic occupancy map 220 may also allow estimation of motion attributes of the dynamic occupants to be utilized for tracking and free space estimation.

The method 700 may proceed to block 708, wherein the method may include completing ground plane estimation. Ground points may cause artifacts in the dynamic occupancy maps that are computed. In one embodiment, the dynamic mapping module 122 may be configured to perform ground point removal upon computing the dynamic occupancy map(s). In another embodiment, the dynamic mapping module 122 may be configured to perform the ground point removal before computing the dynamic occupancy map(s). The dynamic mapping module 122 may determine if the height difference between the highest and lowest point in each cell is less than the predetermined obstacle threshold (predetermined obstacle threshold discussed above):

cell is ground $\Leftrightarrow z_{max} - z_{min} < z_{th}$

In one embodiment, the dynamic mapping module 122 may apply spatial filtering to gather preliminary ground levels from a larger neighborhood and may use an average value as a true ground level. In another embodiment, when there are elevated surfaces within the surrounding environment of the ego vehicle 102, the dynamic mapping module 122 may utilize a mean of lowest ground cells to determine the lowest z value that may be most likely to be an actual ground level. The dynamic mapping module 122 may thereby iterate over all ground cells from low z value to high z value and may further add it to the ground estimation if its z value is close within a predetermined range to a previous z value. The dynamic mapping module 122 may cease the iteration if it is determined that there is a large gap in the z value which indicates an elevated object or surface (e.g., such as tress leaves or roofs of other vehicles). The dynamic mapping module 122 may thereby utilize the mean value of all of the grounds levels up to this point to determine the final ground level. The dynamic mapping module 122 may also maintain a spatial smoothness constraint so that adjacent ground levels are only allowed to change as much as by a predetermined value.

In one embodiment, upon completing the ground plane estimation, the dynamic mapping module 122 may be configured to output a refined dynamic occupancy map 224 that includes the dynamic occupants that are located within the surrounding environment of the ego vehicle 102 with ground plane estimation taken into account. Accordingly, the refined dynamic occupancy map 224 may be computed to remove false occupied cells that may be based on an elevated object or surface that may be caused by a pitch angle of one or more LiDAR sensors 108 and/or of the ego vehicle 102 itself.

The method 700 may proceed to block 710, wherein the method 700 may include communicating with the vehicle autonomous controller 110 to autonomously control the ego vehicle 102 to account for dynamic occupants within the surrounding environment of the ego vehicle 102. In one embodiment, the dynamic mapping module 122 may be configured to communicate data pertaining the dynamic occupants that are located within the surrounding environment of the ego vehicle 102 based on the analysis of the computed dynamic occupancy map(s) (e.g., refined dynamic occupancy map) to the vehicle control module 124.

In an exemplary, the vehicle control module 124 may be configured to communicate with the vehicle autonomous controller 110 of the ego vehicle 102 to execute one or more commands to operably control the ego vehicle 102 to be fully autonomously driven or semi-autonomously driven in a particular manner to account for one or more types of obstacles (e.g., including one or more static occupants) and/or one or more dynamic occupants determined to be located within the surrounding environment of the ego vehicle 102. In particular, the vehicle control module 124 may be configured to communicate with the vehicle autonomous controller 110 of the ego vehicle 102 to execute one or more commands to operably control the ego vehicle 102 to be fully autonomously driven or semi-autonomously driven in a particular manner to account for one or more types of obstacles and/or one or more dynamic occupants.

Accordingly, the vehicle systems/control units 114 of the ego vehicle 102 may controlled to execute one or more discrete actions that may be conducted in a particular manner(s) (e.g., with the application of a particular speed, acceleration, steering angle, throttle angle, braking force, etc.) to account for one or more types of obstacles and/or one or more dynamic occupants. In additional embodiments, the vehicle control module 124 may provide warnings to a driver of the ego vehicle 102 through one or more vehicle systems/control units 114 to warn/alert the driver to account for one or more types of obstacles and/or one or more dynamic occupants.

Figure 10:
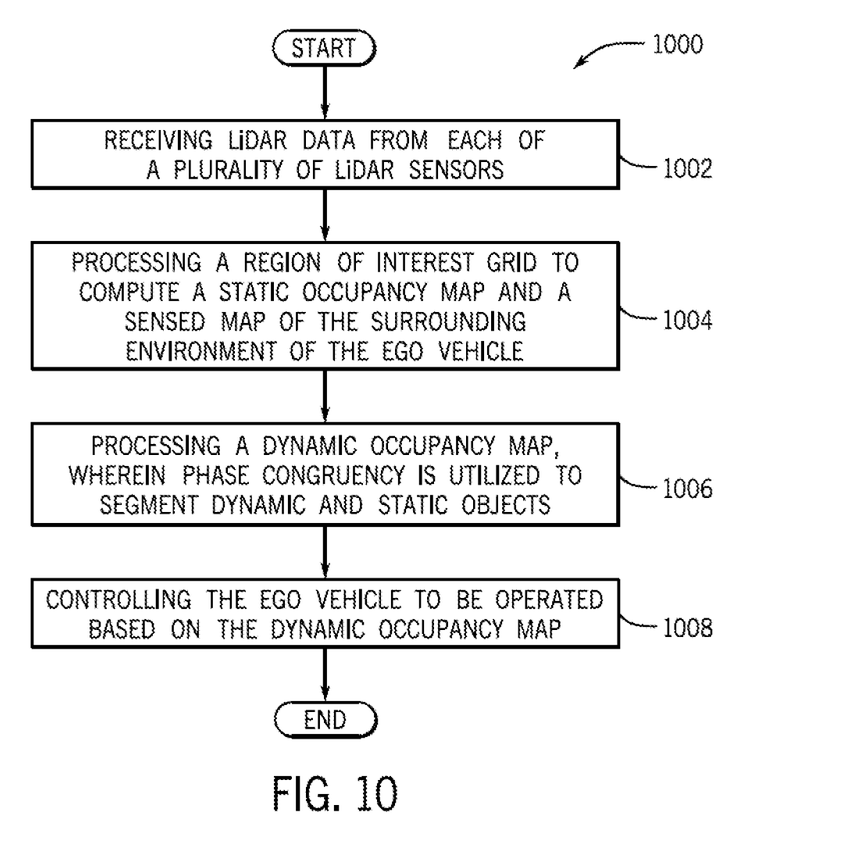
FIG. 10 is a process flow diagram of a method for providing online multi-LiDAR dynamic occupancy mapping according to an exemplary embodiment of the present disclosure.

FIG. 10 is a process flow diagram of a method 1000 for providing online multi-LiDAR dynamic occupancy mapping according to an exemplary embodiment of the present disclosure. FIG. 10 will be described with reference to the components of FIG. 1, through it is to be appreciated that the method 1000 of FIG. 10 may be used with additional and/or alternative system components. The method 1000 may begin at block 1002, wherein the method 1000 may include receiving LiDAR data from each of a plurality of LiDAR sensors 108. In one embodiment, the LiDAR data is associated with a surrounding environment of the ego vehicle 102.

The method 1000 may proceed to block 1004, wherein the method 1000 may include processing a region of interest grid to compute a static occupancy map of the surrounding environment of the ego vehicle 102. The method 1000 may proceed to block 1006, wherein the method 1000 may include processing a dynamic occupancy map. In one embodiment, phase congruency is utilized to segment dynamic and static objects. The method 1000 may proceed to block 1008 and may include controlling the ego vehicle 102 to be operated based on the dynamic occupancy map.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for providing online multi-LiDAR dynamic occupancy mapping, comprising:
    receiving LiDAR data from each of a plurality of LiDAR sensors, wherein the LiDAR data is associated with a surrounding environment of an ego vehicle;
    processing a region of interest grid to compute a static occupancy map of the surrounding environment of the ego vehicle;
    processing a dynamic occupancy map, wherein phase congruency is utilized to segment dynamic and static objects that are determined based on the static occupancy map, wherein a phase congruency score is computed from motion vectors that are determined from cells of the dynamic occupancy map; and
    controlling the ego vehicle to be operated based on the dynamic occupancy map.

2. The computer-implemented method of claim 1, wherein processing the region of interest grid includes receiving the region of interest grid from a region of interest grid pool.

3. The computer-implemented method of claim 2, wherein processing the region of interest grid includes analyzing the LiDAR data received from each of the plurality of LiDAR sensors and processing the region of interest grid for each of the plurality of LiDAR sensors.

4. The computer-implemented method of claim 3, wherein the processed region of interest grid includes cells which partition at least one space of the surrounding environment of the ego vehicle into finitely fixed sized grids.

5. The computer-implemented method of claim 3, wherein processing the region of interest grid includes storing the processed region of interest grid within a region of interest grid buffer to be utilized in global occupancy and grid update processing.

6. The computer-implemented method of claim 5, wherein point coordinates associated with the LiDAR data are transformed from a sensor frame to an ego vehicle frame, wherein transformed point coordinates are distributed into region of interest cells based on respective two-dimensional LiDAR coordinates.

7. The computer-implemented method of claim 6, further including analyzing a height difference between a highest and lowest point in each region of interest cell against a predetermined obstacle threshold to determine if the height difference is greater than the predetermined obstacle threshold, wherein the region of interest cells is marked as an obstacle cell when the height difference is greater than the predetermined obstacle threshold and the static occupancy map is computed.

8. The computer-implemented method of claim 7, wherein processing the dynamic occupancy map includes updating motion cells based on updating obstacle probabilities of region of interest cells, wherein each motion cell includes a grid of occupancy cells.

9. The computer-implemented method of claim 8, wherein the phase congruency score is determined for each motion cell of the dynamic occupancy map from a combination of the motion vectors with previously obtained motion vectors obtained at pervious iterations, wherein the phase congruency score is compared against a predetermined phase congruency threshold to denote at least one cell as a dynamic cell.

10. A system for providing online multi-LiDAR dynamic occupancy mapping, comprising:
a memory storing instructions when executed by a processor cause the processor to:
receive LiDAR data from each of a plurality of LiDAR sensors, wherein the LiDAR data is associated with a surrounding environment of an ego vehicle;
process a region of interest grid to compute a static occupancy map of the surrounding environment of the ego vehicle;
process a dynamic occupancy map, wherein phase congruency is utilized to segment dynamic and static objects that are determined based on the static occupancy map, wherein a phase congruency score is computed from motion vectors that are determined from cells of the dynamic occupancy map; and
control the ego vehicle to be operated based on the dynamic occupancy map.

11. The system of claim 10, wherein processing the region of interest grid includes receiving the region of interest grid from a region of interest grid pool.

12. The system of claim 11, wherein processing the region of interest grid includes analyzing the LiDAR data received from each of the plurality of LiDAR sensors and processing the region of interest grid for each of the plurality of LiDAR sensors.

13. The system of claim 12, wherein the processed region of interest grid includes cells which partition at least one space of the surrounding environment of the ego vehicle into finitely fixed sized grids.

14. The system of claim 12, wherein processing the region of interest grid includes storing the processed region of interest grid within a region of interest grid buffer to be utilized in global occupancy and grid update processing.

15. The system of claim 14, wherein point coordinates associated with the LiDAR data are transformed from a sensor frame to an ego vehicle frame, wherein transformed point coordinates are distributed into region of interest cells based on respective two-dimensional LiDAR coordinates.

16. The system of claim 15, further including analyzing a height difference between a highest and lowest point in each region of interest cell against a predetermined obstacle threshold to determine if the height difference is greater than the predetermined obstacle threshold, wherein the region of interest cells is marked as an obstacle cell when the height difference is greater than the predetermined obstacle threshold and the static occupancy map is computed.

17. The system of claim 16, wherein processing the dynamic occupancy map includes updating motion cells based on updating obstacle probabilities of region of interest cells, wherein each motion cell includes a grid of occupancy cells.

18. The system of claim 17, wherein the phase congruency score is determined for each motion cell of the dynamic occupancy map from a combination of the motion vectors with previously obtained motion vectors obtained at pervious iterations, wherein the phase congruency score is compared against a predetermined phase congruency threshold to denote at least one cell as a dynamic cell.

19. A non-transitory computer readable storage medium storing instructions that when executed by a computer, which includes a processor perform a method, the method comprising:
receiving LiDAR data from each of a plurality of LiDAR sensors, wherein the LiDAR data is associated with a surrounding environment of an ego vehicle;
processing a region of interest grid to compute a static occupancy map of the surrounding environment of the ego vehicle;
processing a dynamic occupancy map, wherein phase congruency is utilized to segment dynamic and static objects that are determined based on the static occupancy map, wherein a phase congruency score is computed from motion vectors that are determined from cells of the dynamic occupancy map; and
controlling the ego vehicle to be operated based on the dynamic occupancy map.

20. The non-transitory computer readable storage medium of claim 19, wherein the phase congruency score is determined for each motion cell of the dynamic occupancy map from a combination of the motion vectors with previously obtained motion vectors obtained at pervious iterations, wherein the phase congruency score is compared against a predetermined phase congruency threshold to denote at least one cell as a dynamic cell.

* * * * *